United States Patent
Krushnevych et al.

(10) Patent No.: US 6,929,680 B2
(45) Date of Patent: Aug. 16, 2005

(54) CO₂ SEPARATOR METHOD AND APPARATUS

(75) Inventors: Tadeush Krushnevych, Kyiv (UA); Olexander Piatnychko, Kyiv (UA)

(73) Assignee: Consortium Services Management Group, Inc., Corpus Christi, TX (US)

( * ) Notice: Subject to any disclaimer, the term of this patent is extended or adjusted under 35 U.S.C. 154(b) by 105 days.

(21) Appl. No.: 10/673,099

(22) Filed: Sep. 26, 2003

(65) Prior Publication Data

US 2005/0066815 A1 Mar. 31, 2005

(51) Int. Cl.⁷ .................... B01D 53/04; B01D 53/14; B01D 53/62
(52) U.S. Cl. .................... 95/93; 95/94; 95/122; 95/236; 96/130; 96/136; 423/232
(58) Field of Search .................... 96/108, 121, 130, 96/134–136, 234, 355; 95/92, 93, 94, 121, 122, 187, 236; 423/232

(56) References Cited

U.S. PATENT DOCUMENTS

| | | |
|---|---|---|
| 2,982,721 A | 5/1961 | Dow |
| 3,469,934 A | 9/1969 | Bocard et al. |
| 3,618,331 A | 11/1971 | Smith et al. |
| 4,000,990 A | 1/1977 | Bingham |
| 4,080,424 A | 3/1978 | Miller et al. |
| 4,097,250 A | 6/1978 | Pagani et al. |
| 4,270,937 A | 6/1981 | Adler et al. |
| 4,478,798 A | 10/1984 | Karwat |
| 4,518,399 A * | 5/1985 | Croskell et al. ............... 95/51 |
| 4,681,612 A | 7/1987 | O'Brien et al. |
| 4,701,187 A | 10/1987 | Choe et al. |
| 4,749,555 A | 6/1988 | Bush |
| 4,770,676 A | 9/1988 | Sircar et al. |
| 4,869,894 A | 9/1989 | Wang et al. |
| H825 H | 10/1990 | Green et al. |
| 5,059,405 A | 10/1991 | Watson et al. |
| 5,451,249 A * | 9/1995 | Spiegel et al. ............... 95/117 |
| 5,453,210 A | 9/1995 | Bardasz et al. |
| 5,514,129 A | 5/1996 | Smith |
| 5,529,612 A | 6/1996 | Troost |
| 5,642,630 A | 7/1997 | Abdelmalek et al. |
| 5,681,360 A | 10/1997 | Siwajek et al. |
| 5,817,093 A | 10/1998 | Williamson, IV et al. |
| 5,838,008 A | 11/1998 | Esler et al. |
| 5,842,357 A | 12/1998 | Siwajek et al. |
| 5,938,819 A | 8/1999 | Seery |
| 5,961,701 A | 10/1999 | Hlynsky |
| 6,071,326 A | 6/2000 | Hall |
| 2001/0001782 A1 | 5/2001 | Ohashi et al. |

FOREIGN PATENT DOCUMENTS

WO        WO 99/39814        8/1999

OTHER PUBLICATIONS

Kohl, A.L. and Buckingham, P.A., "Fluor Solvent CO2 Removal Process", Petroleum Refiner, May, 1960, vol. 39, No. 5, pp. 193–196.

Kohl, A.L. and Buckingham, P.A., "The Fluor solvent CO2–removal process", The Oil and Gas Journal, May 9, 1960, vol. 58, No. 19, pp. 146–156.

* cited by examiner

Primary Examiner—Frank M. Lawrence
(74) Attorney, Agent, or Firm—Charles W. Hanor, P.C.

(57) ABSTRACT

A process for concentrating and recovering methane and carbon dioxide from landfill gas includes absorption of commonly occurring pollutants using a carbon dioxide absorbent which itself may be in situ recoverable constituent. Separated methane is concentrated into a high heating value fuel, and a carbon dioxide product may also be recovered. Process streams may be used to provide fuel for compression and refrigeration and to regenerate carbon dioxide absorbent.

14 Claims, 1 Drawing Sheet

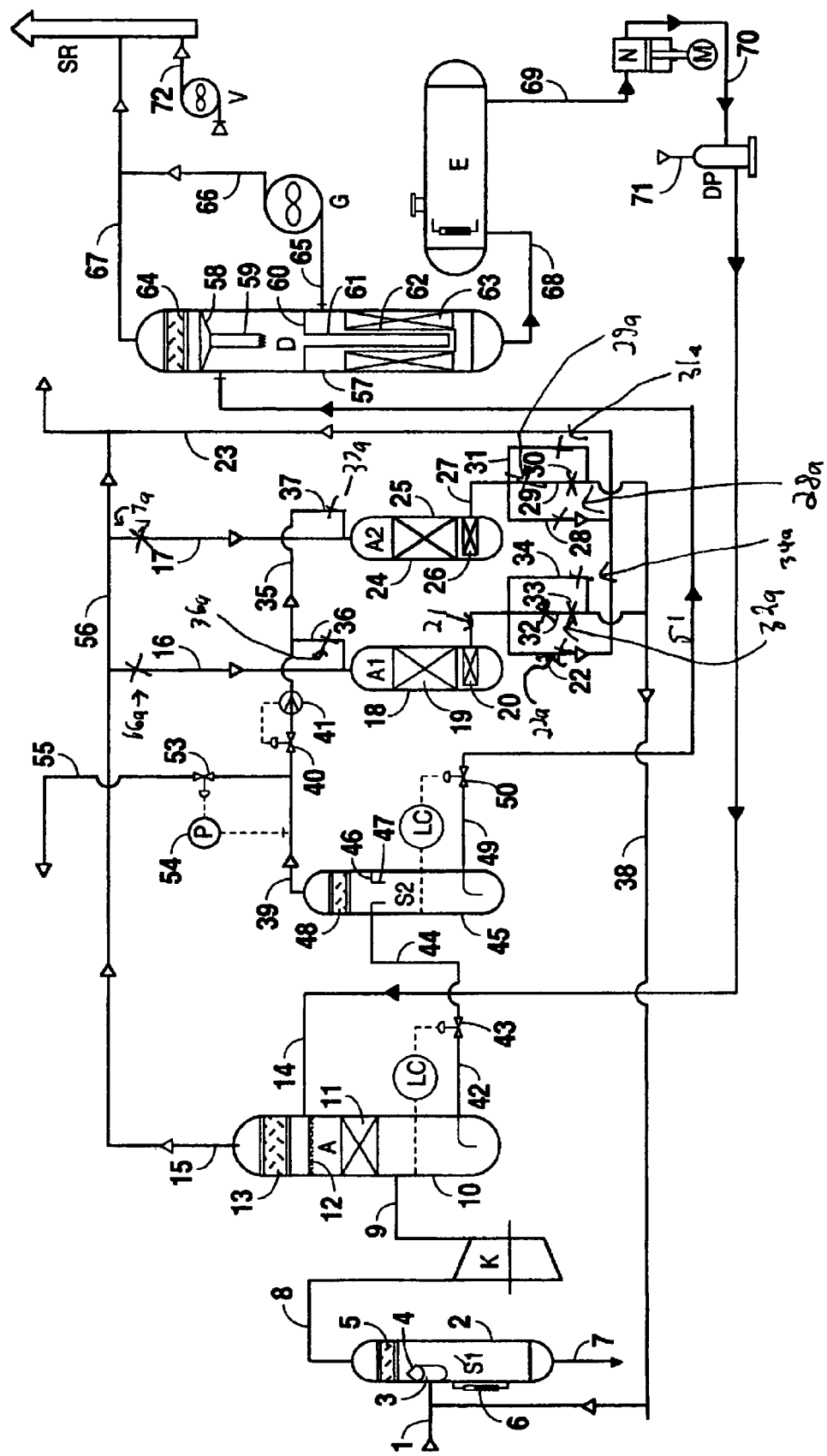

CO₂ SEPARATOR METHOD AND APPARATUS

BACKGROUND OF THE INVENTION

1. Field of the Invention

This invention generally relates to the separation and recovery of methane and carbon dioxide from landfill gas. Process streams provide fuel for compression and refrigeration and/or to regenerate absorbent added to the process for further separation of methane and carbon dioxide.

2. Description of the Related Art

This invention generally relates to the separation and recovery of methane and carbon dioxide from landfill gas. More particularly, the invention provides an improved process for concentrating and removing commonly occurring pollutants from landfill gas using a carbon dioxide absorbent which itself may be an in situ recoverable constituent. The separated methane may be used to provide a source of natural gas, and carbon dioxide product may also be recovered from the landfill gas. Process streams may be used to provide the recovery system and/or to regenerate absorbent used in the process for further separation of methane and carbon dioxide.

The landfill gas may be generated by the decomposition of buried waste or garbage and is principally comprised of methane and carbon dioxide together with minor amounts of nitrogen, oxygen, hydrogen, carbon monoxide and a variety of trace contaminants. As used herein, the landfill gas contains methane and carbon dioxide in mole percents ranging from about 35% to 65% for each constituent, at combined nitrogen and oxygen content of less than about 10% and trace contaminants that may vary widely in type and amount so as to make uniform processing and/or equipment a difficult task to achieve economically. Typical contaminants include hydrocarbons other than methane, halocarbons, oxygenated and sulfur containing hydrocarbons, hydrogen sulfide and carbon monoxide.

Because of its high methane content, landfill gas has attracted much attention as a potential fuel gas. However, in order to utilize landfill gas as a substitute for natural gas in existing fuel distribution systems or as a fuel for internal combustion engines, it is necessary to remove carbon dioxide to raise the heating value of the gas to an acceptable level and to substantially remove the contaminants in a competitively economical manner. This task is especially complicated by the variations in contaminant types and amounts encountered in various landfill gases as well as the gases obtained from a single landfill over a period of time or at different locations in landfill. For example, the processing of a landfill gas containing no hydrogen sulfide may be significantly simplified and less expensive processing operation as compared with a landfill gas containing a hydrogen sulfide contaminant.

Absorbents, such as amines and other commonly used organic solvents, may react with trace contaminants which are generally present in landfill gas to produce compounds which foam, become viscous, or otherwise impair the effectiveness of the absorbent. Even chemically inert organic solvents may be difficult to regenerate once contaminated because of similarities in the physical and chemical properties of the solvents and contaminants. Absorbents which cannot be fully regenerated may continue to accumulate trace contaminants until the absorbent becomes saturated and the contaminants break through with the fuel product. Consequently, some absorption processes often have the disadvantages of routinely requiring fresh solvent and have the potential for permitting toxic contaminants to become present in the fuel product. Moreover, some absorption processes may not facilitate economically feasible recovery of the carbon dioxide, which must instead be incinerated in a stream containing the trace contaminants.

Adsorption processes may also have disadvantages similar to those of absorption processes. In particular, trace contaminants from the landfill gas can become permanently bound to the molecular sieve adsorbent causing fouling and blocking of adsorption sites, thereby increasing the pressure drop across the adsorption column and/or causing loss of capacity. Eventually, sufficient quantities of impurities can accumulate to prevent effective regeneration of the adsorbent and there is also the potential for breakthrough of toxic impurities to the fuel product. Consequently, as with absorbent solvents, fresh adsorbent may be required periodically.

Membrane separation processes for removing carbon dioxide may also have disadvantages. With membrane separations, a significant portion of the methane may not be recovered, and carbon dioxide recovery may not be economically feasible which means that the carbon dioxide stream containing the trace contaminants must be incinerated. Membrane processes also have the potential for allowing toxic contaminants into the fuel product and degradation of the membrane by trace contaminants is possible.

U.S. Pat. No. 4,270,937 to Adler et al., discloses a comprehensive gas separation process for a feed gas containing methane and carbon dioxide together with impurities or contaminants pertinent herein. The Adler et al. process includes an initial liquid carbon dioxide absorption process for removing such contaminants from the feed gas stream as part of a liquid carbon-dioxide-enriched bottom product of the process, and it is observed that such processing may generally be used for separating such high boiling point components from relatively low boiling point gases and carbon dioxide.

While it is known to separate carbon dioxide from methane using a combination of compression and refrigeration, known processes have not further developed this basic technique. For example, U.S. Pat. No. 4,681,612 to O'Brien et al. utilizes the Adler et al. teaching to remove in bulk substantially all of the carbon dioxide present in a landfill gas together with the contaminants. This separation economically impairs any subsequent purification of the carbon dioxide and does not allow for economies in operating or equipment when a landfill gas containing a relatively minimum amount of contaminants is to be processed. Thus, the prior art has not taken full advantage of the contaminant separation capability of carbon dioxide, and therefore has not efficiently utilized refrigeration and compression to effect separation of such products. Consequently, refrigeration methods for separating methane from landfill or other gases having a high carbon dioxide content have been regarded generally as being economically unattractive.

U.S. Pat. No. 5,842,357 entitled "Landfill Gas Recovery", discloses a process for concentrating and recovering methane and carbon dioxide from landfill gas includes absorption of commonly occurring pollutants using a reduced amount of carbon dioxide absorbent which itself may be an in situ derived and recoverable constituent. It further discloses that separated methane may be concentrated into a high heating value fuel, and a highly pure food-grade carbon dioxide product may also be recovered. Process streams are stated to be used to provide fuel for compression and refrigeration and/or to regenerate carbon dioxide absorbent.

United States Statutory Invention Registration No. H 825, entitled "Process for Conditioning a High Carbon Dioxide Content Natural Gas Stream for Gas Sweetening" discloses a process for pretreating a natural gas stream having greater than about 40 mole % $CO_2$ to reduce the amount of $CO_2$ in the gas stream prior to treatment in a conventional sweetening process comprising passing the gas stream through a separator zone which condenses the $C_6$ plus hydrocarbons and then passing the gas stream from the separator into a stripping zone which further reduces the temperature of the gas stream to remove a substantial quantity of $CO_2$ as a liquid condensate.

U.S. Pat. No. 5,642,630, entitled "Process for Solids Waste Landfill Gas Treatment and Separation of Methane and Carbon Dioxide", discloses a system whereby waste landfill gases are treated and separated by a combination of gas cleaning, gas compression, gas cooling, and gas absorption processes to produce high quality liquefied natural gas, liquefied carbon dioxide and compressed natural gas products.

U.S. Pat. No. 5,938,819, entitled "Bulk Separation of Carbon Dioxide from Methane using Natural Clinoptilolite", discloses a system for bulk separation of carbon dioxide from methane by using a modified pressure swing adsorption system where the adsorbent used is a naturally occurring sodium-rich clinoptilolite. Most of the carbon dioxide is removed at low operating pressures, and the principal agent of regeneration is a high volume air rinse rather than pressure reduction.

U.S. Pat. No. 4,749,555, entitled "Process for the selective removal of hydrogen sulphide and carbonyl sulfide from light hydrocarbon gases containing carbon dioxide", discloses a process for the selective removal of H2S and COS from a gas stream using amines and sulfolane at the pressure of 1200 psig and temperature of 40–250 F. A classical gas purification scheme used in all absorption processes is described in this patent. Only the absorbents used in the purification process are specified.

U.S. Pat. No. 4,080,424, entitled "Method for the purification of natural gas having a high contents of acidic gases", suggests a gas purification process using organic physical absorbents and such physical absorbents as N-formylmorpholine, tetraethylene glicol, N-methyl-2-pyrrolidone, propylene carbonate, etc. The absorbent recovery scheme described here is complex and doubtful from the point of view of consistency.

U.S. Pat. No. 4,097,250, entitled "Method for the purification of natural gas having a high contents of acidic gases", discloses a method for removing acid gaserous components from natural gases at low temperatures (down to −35 C.) using dimethyl-ether-dipoliglucol or propylene carbonate, where the gas in the first separation stage is compressed and fed back to the absorber.

U.S. Pat. No. 3,618,331, entitled "Hydrogen manufacture using centrifugal compressors", discloses a process for manufacturing hydrogen and cleaning final products from CO2 using such absorbents as methanol, acetone, propylene carbonate, etc.

U.S. Pat. No. 6,071,326, entitled "Process for the production of naphtha gas from landfill gas", discloses a method for conversion of methane and CO2 in the landfill gas, and obtainment of hydrogen at high temperatures (up to 900° C.). Membrane and adsorption methods of purification are used.

U.S. Pat. No. 5,059,405, entitled "Process and apparatus for purification of landfill gases", discloses a method in which the landfill gas is purified from impurities and burned in the boiler incinerator. Then, in the absorber, CO2 is removed, and nitrogen and oxygen flow out of the absorber. Solid adsorbents and potassium permanganate are used.

U.S. Pat. No. 4,770,676, entitled "Recovery of methane from land fill gas", discloses Separation of landfill gas using the method of adsorption.

U.S. Patent Application No. 20010001782, entitled "Carbon dioxide gas absorbent, method for manufacturing carbon dioxide gas absorbent and apparatus for separating carbon dioxide gas".

PCT Patent Application No. WO 99/39814, entitled "Landfill gas treatment with propylene carbonate, concerns landfill gas purification using carbon propylene". The invention discloses removing $CO_2$ from the landfill gas to the absorbent in a column containing packing or trays, and further regeneration of the absorbent by heating at a low pressure. The absorbent suggested here is propylene carbonate known for about 40 years to have been used for this purpose.

Landfill gases when released into the atmosphere may become a source of global warning greenhouse gas and smog-forming volatile organic gaseous emissions. The present environmental regulations require that landfill sites should be equipped with gas collection systems to control and prevent release of odors and landfill gaseous products into the environment. A gas collection system may be employed to provide a negative pressure to pull out the landfill gas and to maintain low surface concentrations of gas at the ground surface, the collected gas is normally burned in boilers or flared into the atmosphere.

A typical landfill collection gas system may include vertical and horizontal wells collecting gas from decaying organic matter at various levels underground with the wells being connected by a pipe header at the ground surface. An oxygen sensor may continuously monitor potential air migration and may control the landfill collection process to prevent atmospheric air from entering the system.

A landfill gas source may contain by volume basis an average of approximately 55% methane, 40% carbon dioxide, 2.3% nitrogen, 0.6% oxygen, 2% water vapor, less than 100 parts per million (PPM) of hydrogen sulfide and other insignificant smaller amounts of sulfur and hydrocarbon compounds.

One proposed method for treating landfill gas is to process it for treating and separating the methane and carbon dioxide to produce high quality liquefied natural gas (LNG), liquefied carbon dioxide and compressed natural gas (CNG) products. A high octane more uniform methane fuel (natural gas) may be produced and conveyed into the natural gas utility pipe lines for domestic use. It may be produced as compressed natural gas (CNG) for fueling vehicles similar to motor cars, tracks, busses, etc. or may be produced as liquefied natural gas (LNG) to drive heavy equipment similar to railroad locomotives and marine entries, and for other uses that provide both economic and environmental benefits. Carbon dioxide gas may be processed to produce liquefied carbon dioxide gas products that may be tracked off site or conveyed by a pipe line to remote chemical manufacturing facilities for further processing and manufacturing of chemical products. The carbon dioxide separated from the landfill gas will replace a part of industrially produced carbon dioxide that require burning fossil fuel, thus providing the potential for both economic and environmental benefits. A landfill site may produce between 1.0 and 15.0 million standard cubic foot per day (MMSCFD) of land fill gas. A system that treats 1.0 MMSCFD of landfill gas may produce up to 5,000 gallons per day of liquefied natural gas (LNG) and 20 tons per day of liquid carbon dioxide.

Methods of removing carbon dioxide from landfill gas have included chemical or physical absorption and permeable membrane separation which occurs at much lower operating gas pressures. Chemical or physical absorption processes typically employ an aqueous alkanolamine solution or a solvent to contact the gas stream in a trayed or packed vessel (separator). The amine solution is a weak organic base which removes the carbon dioxide from the gas stream. The $CO_2$-rich amine stream which is loaded with carbon dioxide is heated and flashed at much lower pressure into a second separator (the regenerator) to produce a $CO_2$-lean amine. The combination of lower pressure and higher temperature cause a reversal of the chemical reactions which occurred within the fluid contractor, carbon dioxide is released from the amine solution or the solvent fluid and is vented through the top of the regenerator. Advantages of the chemical or physical absorption processes are achieving low concentrations of carbon dioxide in the methane gas; disadvantages, include high capital and operating costs, high fuel consumption, complexity of operations and costly oversized equipment to remove high content of carbon dioxide (30% or more by volume).

In permeable membrane processes, membranes separate gases by selective permeation of the gases in contact with the membrane. The gases move across the membrane barrier as a result of imposed partial pressure gradients. The gases are separated based on diffusivity through the membrane material. The membrane material can be one of several molecular sieves depending on the composition of the mixture of gases to be separated. Higher quality and purity of product require two or more stages of membrane separators and recycling intermediate concentrations of gas stream back to the inlet of the first stage membrane system. Advantages of using permeable membranes are ease of operation and a higher degree of gas separation is achieved. Disadvantages include higher initial cost, higher maintenance cost, higher operating cost, expensive replacements of membranes, and costly oversized equipment to recycle and reheat a large percentage of the gas stream entering the first membrane stage.

In the past, it was believed that neither the carbon dioxide gas absorption nor the permeable separation processes for treating a landfill gas containing 30% (vol.) or more of carbon dioxide, has proven to be economically attractive for treating landfill gases from sites that produce less than 5 MMSCFD, especially when additional costs will be needed to compress the treated methane gas for producing liquid natural gas (LNG) and compressed natural gas (CNG).

The present invention employs a regenerative absorbent or solvent fluid to absorb most of the trace amount of carbon dioxide contained in the methane rich gas stream. Regenerative absorbents and solvents have been used in the past for scrubbing carbon dioxide ($CO_2$) hydrogen sulfide ($HSO_2$) and other landfill gas contaminants. Well known thermally organic amines as monoethanlamine and diethanolamine have been widely used for $CO_2$ absorption.

In view of the prior art, it is evident that a cost effective process for recovering both a methane-rich fuel product and a highly pure carbon dioxide product from landfill gas, and for regenerating the absorbent material, is desirable.

BRIEF SUMMARY OF THE INVENTION

In response to the difficulties in extracting relatively pure methane and carbon dioxide from landfill gas, the present invention utilizes a carbon dioxide absorbent to separate impurities. The carbon dioxide absorbent may itself be recovered.

In particular, carbon dioxide and other contaminants are first separated from landfill methane gas in an absorber by a carbon dioxide absorbent. The purified methane gas can then be additionally dehumidified. The carbon dioxide absorbent is partially regenerated by separating much of the carbon dioxide and methane from the absorbent in a second separator.

Water vapor is removed from purified methane gas in one of two dehumidifying absorbers. While one dehumidifier is dehumidifying gas from the absorber, the other may be regenerating its adsorbent with gas taken from the second separator. The gas from the second separator dehumidifies the adsorbent before being returned to the first separator, thereby increasing the operating efficiency of the system because less methane is lost.

The absorbent used in the absorber to separate carbon dioxide from the landfill gas is regenerated by using a desorber. The desorber degasses the adsorbent by lowering the pressure of the gas. The regenerated absorbent is then conducted back to the first absorber for use in removing additional carbon dioxide.

BRIEF DESCRIPTION OF THE DRAWING

FIG. 1 is a diagram showing an embodiment of the invention.

DETAILED DESCRIPTION OF THE INVENTION

The purification process of the invention is designed to work with excessive landfill methane gas output compared to its extraction from a landfill. Vacuum is not used in the supplying pipeline because any entry of air should be avoided. Landfill methane gas output from landfills may vary considerably depending on season, day and night, rains, cold etc.

On closed landfills the landfill methane gas may flow from wells to a collector at the quantity of as much as 300 m$^3$/hour (10595 feet$^3$/hour) and more, depending on the volume of a landfill, year of usage, time of the year, day or night, weather conditions and other. The gas in the collectors is usually burned by flaring.

As shown in FIG. 1, the gas flows from a collector through a pipeline 1 to a separator S1. The separator S1 comprises a cylindrical body 2 with elliptic end caps. The separator S1 includes a shaped partition 3 with a lid 4, and a filter element 5 inside the separator.

The gas flowing in the pipeline 1 may contain liquids and solids. It is diverted from the center of the separator as it enters by partition 3 and lid 4, and is directed to the wall of the vessel. The gas flow is circular inside the separator.

The heavier liquids and solids in the gas flowing into the separator engage the inner wall surfaces of the separator and fall out toward the lower part of the separator. The liquids and solids accumulate in the lower part of the separator. This enables discharge of the liquids and solids from the separator S1 and though a discharge pipe 7 into a drainage line to a storage container, when the liquids and solids reach a certain level determined by a level indicator 6.

The gas in the separator that remains in a gas phase is passed through a filter 5. In the filter 5, the finely dispersed liquid becomes additionally condensed at a low gas speed and it condenses into larger liquid particles and drops to the lower part of the separator S1. The gas that is separated from the liquids and solids passes from the upper portion of the separator S1 through pipe 8.

The gas in pipe 8 is principally methane gas. It flows through the pipeline 8 to the compressor unit K where it is compressed to a pressure of 15–100 bar (217.0–1450.0 psia). A compressor unit usually comprises inter-stage and terminal gas refrigerators and separators, water—water and water-air cooling systems for the compressor cylinders and other auxiliary equipment.

The landfill gas flows from a compressor K through a pipe 9 to the lower part of an absorber A. The absorber A comprises a cylindrical body 10 with elliptic end caps or bottoms. It includes a mass-transfer section 11, an irrigator 12 and a filter 13. The mass-transfer section includes a set of stacks of regular packing, manufactured in the form of stacks with holes and inclined corrugations. The main condition for usage of mass-transfer devices is a high water carrying capacity of up to 150–250 $m^3$ ($m^2$ hour).

The irrigator 12 is a device which distributes the absorbent uniformly over the whole apparatus section in order to increase efficiency of the mass transfer process. It includes a multipath spider with downward holes.

The filter 13 is a roll close-meshed net with the mesh openings being sized from 1 to 6 mm. It may also be a filtering element with a clear opening of 60–90%.

The methane gas flows through the pipe 9 to the lower mass-transfer section 11 of the absorber A for distributing through the separator and moves upward. A physical absorbent is simultaneously supplied by a pipe 14 to the top part of the separator mass-transfer section 11 through the irrigator 12. One type of physical absorbent that can be used is industrial propylene carbonate. The absorbent flows under gravity through the packing and contacts the ascending methane gas. The gas and the absorbent are mixed and due to the different partial pressure of the carbon dioxide in the absorbent and in the methane gas, the carbon dioxide becomes liquefied, i.e. $CO_2$ is absorbed by the absorbent. At the outlet of the lower part of the mass-transfer section, the absorbent becomes saturated with carbon dioxide up to as much as 80–90%, which depends on the height of the mass-transfer section, packing used, movement modes of the gas and liquid in the mass-transfer section. The carbon dioxide is extracted from the methane gas ascending the mass-transfer section by the absorbent. As much as 90–95% of the carbon dioxide is extracted from the outlet gas as it passes through the upper part of the mass-transfer section, depending on the operating mode of the gas purification unit. The purified gas passing out of the separator A may contain 0.5–3% vol. of carbon dioxide. This degree of carbon dioxide removal is usually sufficient to use the obtained gas in various technological processes, including transporting the gas in cross-country gas lines alone or in the mixture with natural gas from standard drilled wells. Along with the carbon dioxide, sulfides may also extracted from the methane gas in separator A.

The physical absorption used in the purification process allows regeneration of the absorbent by lowering the pressure, without heating the absorbent, and does not require any fuel consumption, which can be as much as 20%, for regeneration of a chemical absorbent (for instance, monoethanolamine).

The absorbent used may be industrial propylene carbonate because its absorbability of carbon dioxide is high and its cost is low compared to other physical absorbents. The absorbability of propylene carbonate depends to a large extent on the absorption temperature and pressure. The partial pressure of carbon dioxide should preferably be no less than 4 bar (58.0 psi), and the residual carbon dioxide in the purified gas will be 1–3% vol. depending on the process condition.

The temperature of the absorbent supplied to the absorber is preferably maintained in the range of +5° C. to +40° C. Lower operating temperatures of the process will enable reducing absorbent consumption by approximately 70%, energy consumption for the absorbent circulation and specific amounts of metal and equipment dimensions.

Propylene carbonate has a minor dehumidifying ability. However, additional dehumidification of the purified landfill methane gas can be carried out in a separate dehumidification unit, and a need for it can be specified in each case separately depending on further use of the purified gas. Parameters of the gas purification process must be defined in each specific case depending on conditions of usage of the purified gas, refrigerant (water or air), environment and other.

The purified gas flows in pipes 15, 16, and 17 to be dehumidified through the removal of water vapor in alternate absorbers A1 and A2. The purified gas may in some cases be supplied directly to the consumer by a pipeline 56, bypassing additional dehumidification in the absorbers.

The dryer A1 has a cylindrical body 18 with a section 19 filled with adsorbent. Granulated silica gel may be used as an adsorbent. A change filter 20 is located in the lower part of the dryer A1. The gas that has been purified with the removal of carbon dioxide flows from the absorber A in the pipes 15 and 16 to the upper part of the dryer A1 and passes the silica gel layer which absorbs water vapor from the gas. The residual water vapor is generally no more than 0.1 $gram/m^3$. The dehumidified or dry gas passes through the filter 20 to separate solid dust particles carried away from the silica gel layer. The gas can then be delivered to consumers by the pipelines 21, 22, and 23.

The dryer A2 is similar to the dryer A1 and comprises a cylindrical body 24 having a section 25 inside it that is filled with adsorbent, and a filter 26. The dehumidified dry gas can then be delivered to consumers by the pipelines 27, 28 and 23.

While the dryer A1 operates to provide drying and dehumidification, the dryer A2 regenerates the adsorbent by removal of the adsorbed humidity from the silica gel. The adsorbent is regenerated by supplying a part of the gas flow from the separator S2. The gas flow is supplied by pipe 39 to a flow governor comprising a consumption detector 41 and a governor valve 40 to maintain the gas consumption at a preset level. The regenerated gas flows through an open electric valve 37a on pipe 37 to the upper part of the dryer A2, passes through silica gel layer 25 and goes through the filter 26 to the pipe 27 and through an open electric valve 31a into pipe 38. Pipe 38 conducts the gas to the inlet of the separator S1. The pressure of the regenerated gas in the absorber is within 0.5–1.5 bar and depends on the hydraulic resistance of the adsorbent layer and pipelines.

This regeneration method provides for returning the regenerated gas to the inlet of the separator S1 instead of discharging the gas to the dispersion stack. This can save approximately 3% of the purified methane.

The absorbent saturated with carbon dioxide is accumulated in the lower part of the absorber A. The absorbent flows in the pipes 42 and 44 to the separator S2. A constant level of liquid in the absorber is maintained by a level controller LC and a governor valve 43.

The pressure in the separator S2 is maintained at 40–80% of the pressure in the absorber A. Since the pressure of liquids in the pipeline 44 is less than in the absorber, dissolved gases (methane, nitrogen, oxygen, carbon dioxide) become separated from the absorbent after flowing through a governor valve 43, and a gas-liquid mixture goes in the pipe 44 to the separator S2.

When the pressure in the separator S2 is high, the major amount of dissolved methane and some of the carbon dioxide are separated from the absorbent. When the pressure in the separator S2 is low, almost all of the methane and a considerable amount of carbon dioxide (50–70% vol.) are separated. Only the dissolved carbon dioxide is left in the absorbent. Separator S2 comprises a cylindrical body 45 with elliptic end caps or bottoms. Inside the separator S2 there is a partition 46 with a branch pipe 47 located in the center and a filter element 48.

The gas-liquid flow is supplied in the pipe 44 to the inlet of the separator through a tangentially located pipe connection that causes the whole flow to rotate.

A heavier liquid stage is flowed to the walls of the separator and flows while rotating under gravity to the lower part of the separator S2. Gases which are relatively low solubility (methane, nitrogen, oxygen), are separated from the liquids.

The volume of separated liquids depends upon the pressure and the temperature in the separator and may change when the operation mode of the gas purification unit is changed.

The liquids are accumulated in the lower part of separator S2 and when the liquids reach a certain level controlled by the level controller LC, the liquids are removed into a pipe 49 by a level controller 50 and into a pipe 51 and further to an atmospheric deaerator D.

At the initial point when the gas phase enters the separator S2 and after the whole flow is whirled, the gas phase moves for some time downward, then the direction of the flow changes and it goes to the central pipe 47. Then the gas moves upward, is expanded above the partition 46 and slowly enters the filter 48. In the filter 48 the finely dispersed liquid stage becomes additionally condensed. At a low gas flow; it becomes condensed into larger particles and runs off the partition 46 and further runs off the internal walls of the pipe 47 to the lower part of the separator S2.

The separated and filtered gas containing 20–50% of methane, nitrogen, oxygen and carbon dioxide is removed from the separator S2 in the pipe 39 and then a part of the gas flows to regeneration of the absorbent through the governor valve 40 and consumption detector 41, as is described above.

A preset pressure in the separator S2 is maintained by a pressure transducer 54 and by a governor valve 53 by releasing a part of the gas through pipe 55 to the flare, to the dispersion stack or the gas may be returned to the inlet of the separator S1. This gas may also be used as a fuel gas to obtain heat using special-purpose burners.

After 0.5–2 hours of operation, the absorber A1 may be switched from the gas dehumidification mode to the regeneration mode, and absorber A2 may be switched from the regeneration mode to the gas dehumidification mode.

In order to switch dryer A1 from regeneration mode to gas dehumidification mode, the gas supply to the dryer A1 from the separator S2 is discontinued by turning off the electric valve 36a. The electric valves 32a and 34a close to shut off gas supply back to separator S1. The electric valves 16a and 22a are also opened to allow flow into pipe 23. The absorber A1 may operate in dehumidifying mode in parallel with absorber A2.

To switch dryer A1 from gas dehumidification mode to regeneration mode, the gas flow to dryer A1 from the absorber A is shut off by closing an electric valve on pipe 16. The electric valve at 32a is opened, and the electric valve at 22a is closed. The gas in the dryer A1 flows to the separator S1 in the pipes 21, 32, and 38 through the restrictor valve 33 which restricts abrupt gas discharge. This gas flow at this point contains almost pure methane which eliminates the need to discharge it to the dispersion stack or to the flare. When the gas pressure in the dryer A1 drops to 0.5 bar, the electric valves 34a and 36a on the pipes 34 and 36 are opened and gas from separator S2 flows in the pipes 39 and 36 to the dryer A1. As the gas passes through the dryer A1 it absorbs moisture from the adsorbent. The gas then flows to the separator S1 in pipes 21, 34, and 38. When absorber A1 is operating in regeneration mode, absorber A2 is operating in gas dehumidification mode.

In order to switch dryer A2 from regeneration mode to gas dehumidification mode, the gas supply to the dryer A2 from the separator S2 is discontinued by turning off the electric valve 37. The electric valves 29a and 31a close to shut off gas supply back to separator S1. The electric valves 17a and 28a are also opened to allow flow into pipe 23. The absorber A2 may operate in dehumidifying mode in parallel with absorber A1.

To switch dryer A2 from gas dehumidification mode to regeneration mode, the gas flow to dryer A2 from the absorber A is shut off by closing an electric valve 17a on pipe 17. The electric valve at 29a is opened, and the electric valve at 28a is closed. The gas in the dryer A2 flows to the separator S1 in the pipes 27, 29, and 38 through the restrictor valve 30 which restricts abrupt gas discharge. This gas flow at this point contains almost pure methane which eliminates the need to discharge it to the dispersion stack or to the flare. When the gas pressure in the dryer A2 drops to 0.5 bar, the electric valves on the pipes 31 and 37 are opened and gas from separator S2 flows in the pipes 39 and 37 to the dryer A1. As the gas passes through the dryer A2 it absorbs moisture from the adsorbent. The gas then flows to the separator S1 in pipes 27, 31, and 38. When absorber A2 is operating in regeneration mode, absorber A1 is operating in gas dehumidification mode.

A partially degassed absorbent flows from the separator S2 through pipes 49 and 51 to the desorber D. The desorber D is divided in two parts with the upper part at atmospheric pressure and the lower part under vacuum. The desorber D comprises a cylindrical body 57 with elliptical end caps or bottoms and a partition 58 with a branch pipe 59 and a partition 60 with a branch pipe 61, a waterlock 62, a packing 63 and a filter 64 disposed in it. The gas-liquid flow formed after the pressure decrease to the atmospheric on the governor valve 50 of the separator S2 is supplied by the pipeline 51 to the inlet of the desorber D through a tangentially disposed pipe connection and as a result the whole flow is caused to rotate.

A heavier liquid stage engages the walls of the separator and rotates under gravity to the partition 60, while the major amount of carbon dioxide is separated from the liquid.

At the initial point when the gas phase enters the desorber D and after the whole flow is whirled, the gas phase moves for some time downward, then the direction of the flow changes and it goes to the central pipe 59. Then the gas moves upward, is expanded above the partition 58 and slowly enters the filter 64. In the filter 64 the finely dispersed liquid stage becomes additionally condensed. At a low gas flow; it becomes condensed into larger particles and drops and runs off the partition 58 and further runs off the internal walls of the pipe 59 to the partition 60.

The separated and filtered carbon dioxide is removed from the desorber D by the pipe 67 and flows to the dispersion stack SR, or a marketable end product may be obtained from it (solid or liquid carbon dioxide).

The liquid stage—the absorbent—flows over to the waterlock from the partition 60 through the branch pipe 61. The waterlock is formed by the branch pipe 61 and the branch pipe 62 closed in the lower part. The liquid transfers from the upper part of the branch pipe 62 onto the packing or plates 63, runs off to the lower part of the desorber D and is removed in the pipeline 68 to the tank E.

The regenerated absorbent goes from the tank E in the pipeline 69 to the suction of the pump N, is compressed and is supplied in the pipelines 70 and 14 for irrigation of the packing in the absorber A.

Between the pipelines 70 and 14 there is a liquid depressurizer DP designed for decreasing pulse liquid movement of plunger pumps. Nitrogen or methane is delivered in a pipeline 71 to the depressurizer to create a gas cushion which smoothes pulsation of the liquid.

In order to create a vacuum there is a vacuum pump G connected the lower part of the desorber D. The vacuum pump is connected by the pipeline 65 with the lower vacuum part of the desorber under the partition 60. The carbon dioxide goes from the vacuum pump G through the pipe 66 to the pipe 67 and further to the dispersion stack SR.

A vacuum (about 3 meters of water column, 30 kPa) is created in the vacuum part of the desorber D by the vacuum pump G. This vacuum may provide extraction of an additional 20% of carbon dioxide from the absorbent. This causes a deeper regeneration of the absorbent to take place and the degree of the marketable gas purification from carbon dioxide can be increased. This can be of major importance when the gas purification unit is used in a hot climate.

The regenerated absorbent transfers from the desorber D to the tank E due to a positioning of the tank E on the same level with the lower part of the desorber D and due to them being connected by the pipe 68 on the lower portion of the desorber D and the tank E through siphoning action.

The temperature of the absorbent falls to about its initial level due to desorption of the absorbed gas in the desorber. The temperature of the absorbent should be maintained at the lowest possible level (5–35° C.). This will allow reduction of the absorbent specific consumption and reduced energy consumption for gas purification.

The desorbed gas—carbon dioxide—is carried by the pipelines 66 and 67 and released to the dispersion stack. Taking into account that carbon dioxide is almost twice the weight of air, and that it may accumulate in gas purification unit area, the dispersion stack is a vertical pipe, no less than 10 meters high. The ventilation fan V delivers air from the bottom through the pipeline 72 to the dispersion stack. The amount of air from the ventilation fan V exceeds the released carbon dioxide by 10 and more times. This provides that the outlet concentration of carbon dioxide will be less than 10% vol. This flow is further mixed with the surrounding air and is diluted to a harmless amount.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

We claim:

1. A process for landfill gas treatment and separation of methane gas and carbon dioxide gas contained therein, and for producing natural gas, carbon dioxide, and regenerating a carbon dioxide absorption material, comprising the steps of:

flowing landfill methane gas from wells to a collector, conducting the gas from the collector to a first separator and separating any heavier liquids and solids in the gas flowing into the first separator;

compressing the gas from the first separator and conducting it to an absorber having an absorbent therein;

mixing the gas and an absorbent to produce carbon dioxide saturated absorbent and purified methane gas containing little carbon dioxide;

separating much of the carbon dioxide and methane gas from the carbon dioxide saturated absorbent in a second separator;

removing any excess water vapor from the purified methane gas in one of two alternate dehumidifying absorbers with an adsorbent;

regenerating the adsorbent in either of the two dehumidifying absorbers by supplying gas from the second separator;

conducting the gas used to regenerate the adsorbent from the dehumidifying absorber to the first separator;

switching between regenerating the adsorbent and dehumidifying the purified methane gas; and regenerating the carbon dioxide saturated absorbent.

2. The process of claim 1, wherein the absorbent in the first absorber comprises propylene carbonate.

3. The process of claim 1, wherein the adsorbent in the dehumidifying absorbers comprises silica gel.

4. The process of claim 1, wherein opening and closing electric valves switches between regeneration of the adsorbent and dehumidification of the purified methane gas.

5. The process of claim 4, wherein switching to dehumidifying the purified methane gas further comprises;

opening an electric valve to connect the first absorber and the dehumidifying absorber;

closing an electric valve to separate the second separator from the dehumidifying absorber;

closing an electric valve to separate the dehumidifying absorber from the first separator.

6. The process of claim 4, wherein switching to regenerating the adsorbent further comprises:

closing an electric valve to separate the first absorber from the dehumidifying absorber;

opening an electric valve to connect the second separator to the dehumidifying absorber;

opening an electric valve to connect the dehumidifying absorber to the first separator.

7. The process of claim 1, wherein the carbon dioxide saturated absorbent is regenerated by:

degassing the carbon dioxide saturated absorbent in a desorber connected to the second separator, thereby producing regenerated absorbent and carbon dioxide gas;

maintaining a vacuum in the desorber to cause a deeper regeneration of the carbon dioxide saturated absorbent to take place;

conducting the regenerated absorbent to a tank connected to the desorber;

compressing the regenerated absorbent with a suction pump;

smoothing the pulsation of the regenerated absorbent with a liquid depressurizer connected to the suction pump;

conducting the regenerated absorbent to the first absorber.

8. An apparatus for landfill gas treatment and separation of methane gas and carbon dioxide gas contained therein, and for producing natural gas, carbon dioxide, and regenerating a carbon dioxide absorption material, comprising:

gas wells providing a source of landfill methane gas;

a collector connected to the gas wells;

a first separator connected to the collector, the separator capable of separating any heavier liquids and solids in the landfill methane gas flowing into the first separator;

a compressor unit connected to the collector that compresses the gas exiting the first separator;

a first absorber connected to the compressor unit in which an absorbent and the landfill methane gas are mixed, thereby producing a carbon dioxide saturated absorbent and methane gas from which most of the carbon dioxide has been extracted;

a second separator connected to the first absorber in which much of the carbon dioxide and methane is separated from the carbon dioxide saturated absorbent;

a first dehumidifying absorber connected to the first absorber, the second separator, and the first separator;

a second dehumidifying absorber connected to the first absorber, the second separator, and the first separator;

an adsorbent contained within the first and second absorbers;

a gas dehumidification configuration in which the adsorbent strips water from the purified methane gas exiting the first absorber;

a regeneration configuration in which gas from the second separator strips water from the adsorbent in the first or second dehumidifying absorbers before conducting the gas from the second separator to the first separator;

a means for switching the first and second absorbers from the gas dehumidification configuration to the regeneration configuration, a desorber apparatus connected to the second separator and the first absorber that removes most of the carbon dioxide from the saturated absorbent before conducting the regenerated absorbent to the first absorber.

9. The system of claim 8, wherein the absorbent in the first absorber comprises propylene carbonate.

10. The system of claim 8, wherein the adsorbent in the dehumidifying absorbers comprises silica gel.

11. The system of claim 8, wherein the means for switching the first and second absorbers between the gas dehumidification configuration and the regeneration configuration comprises electric valves.

12. The system of claim 11, wherein the gas dehumidification configuration further comprises:

an open electric valve connecting the first absorber and the dehumidifying absorber;

a closed electric valve separating the second separator from the dehumidifying absorber;

a closed electric valve separating the dehumidifying absorber from the first separator.

13. The system of claim 11, wherein the regeneration configuration further comprises:

a closed electric valve separating the first absorber from the dehumidifying absorber;

an open electric valve connecting the second separator to the dehumidifying absorber;

an open electric valve connecting the dehumidifying absorber to the first separator.

14. The system of claim 8, wherein the desorber apparatus further comprises:

a desorber connected to the second separator that degasses the carbon dioxide saturated absorbent from the second separator to produce regenerated absorbent and carbon dioxide gas;

a vacuum pump connected to the desorber that causes a deeper regeneration of the carbon dioxide saturated absorbent to take place;

a tank connected to the desorber into which the regenerated absorbent from the desorber flows;

a suction pump connected to the tank that compresses the regenerated absorbent;

a liquid depressurizer connected to the suction pump that smoothes the pulsation of the liquid;

a pipe connecting the liquid depressurizer to the first absorber, thereby conducting the regenerated absorbent to the first absorber.

\* \* \* \* \*